United States Patent [19]
Thomann et al.

[11] Patent Number: 5,838,959
[45] Date of Patent: Nov. 17, 1998

[54] PROGRAMMABLE DATA PORT CLOCKING SYSTEM WITH AUTOMATIC DISABLE AND NOISE SUPPRESSION FOR ASYNCHRONOUS TRANSFER MODE SYSTEMS

[75] Inventors: Mark Thomann; Huy Thanh Vo; Glen E. Hush, all of Boise, Id.

[73] Assignee: Micron Technology, Inc., Boise, Id.

[21] Appl. No.: 892,609

[22] Filed: Jul. 14, 1997

Related U.S. Application Data

[63] Continuation of Ser. No. 478,325, Jun. 7, 1995, Pat. No. 5,680,595.

[51] Int. Cl.$^6$ .................................................. G06F 13/40
[52] U.S. Cl. ...................................... 395/559; 395/200.68
[58] Field of Search .................................... 395/556, 559, 395/560, 284, 306, 307, 308, 311, 200.68; 370/254, 351

[56] References Cited

U.S. PATENT DOCUMENTS

| | | | |
|---|---|---|---|
| 4,631,702 | 12/1986 | Korba | 364/900 |
| 4,701,747 | 10/1987 | Isherwood et al. | 340/365 |
| 4,891,794 | 1/1990 | Hush et al. | 365/189 |
| 4,893,305 | 1/1990 | Fernandez et al. | 270/254 |
| 4,914,429 | 4/1990 | Upp | 340/825 |
| 5,261,059 | 11/1993 | Hedberg et al. | 395/325 |
| 5,444,700 | 8/1995 | Martikainen et al. | 370/58.1 |

OTHER PUBLICATIONS

Sakaue, K., et al., "A 0.8–um BiCMOS ATM Switch on an 800–Mb/s Asynchronous Buffered Banyan Network", *IEEE Journal of Solid–State Circuits*, vol. 26, No. 8, pp. 1133–1144, (Aug. 1991).

*Primary Examiner*—Thomas M. Heckler
*Attorney, Agent, or Firm*—Schwegman, Lundberg, Woessner, & Kluth, P.A.

[57] ABSTRACT

A programmable multiconfiguration data port clocking system for use in asynchronous transfer mode communication (ATM) networks. The clocking system is programmed using a number of preselected configuration codes to automatically switch the clocking of the data port configuration of an ATM network chip. The clocking system incorporates an automatic disable circuit for eliminating random outputs from unused pins in the clocking hardware. The clocking system also employs a noise suppression circuit for reducing spurious noise into the ATM network.

14 Claims, 11 Drawing Sheets

| | PORTS → | 0 | 1 | 2 | 3 | 4 | 5 | 6 | 7 |
|---|---|---|---|---|---|---|---|---|---|
| 1 | 0000 | CLK0 FRM0 | CLK1 FRM1 | CLK2 FRM2 | CLK3 FRM3 | CLK4 FRM4 | CLK5 FRM5 | CLK6 FRM6 | CLK7 FRM7 |
| 2 | 0001 | CLK0 FRM0 | | CLK2 FRM2 | CLK3 FRM3 | CLK4 FRM4 | CLK5 FRM5 | CLK6 FRM6 | CLK7 FRM7 |
| 2 | 0010 | CLK0 FRM0 | CLK1 FRM1 | CLK2 FRM2 | CLK3 FRM3 | CLK4 FRM4 | CLK5 FRM5 | CLK6 FRM6 | |
| 3 | 0011 | CLK0 FRM0 | | CLK2 FRM2 | | CLK4 FRM4 | CLK5 FRM5 | CLK6 FRM6 | CLK7 FRM7 |
| 3 | 0100 | CLK0 FRM0 | CLK1 FRM1 | CLK2 FRM2 | CLK3 FRM3 | CLK4 FRM4 | | CLK6 FRM6 | |
| 4 | 0101 | CLK0 FRM0 | | CLK2 FRM2 | | CLK4 FRM4 | | CLK6 FRM6 | CLK7 FRM7 |
| 4 | 0110 | CLK0 FRM0 | CLK1 FRM1 | CLK2 FRM2 | | CLK4 FRM4 | | CLK6 FRM6 | |
| 5 | 0111 | CLK0 FRM0 | | CLK2 FRM2 | | CLK4 FRM4 | | CLK6 FRM6 | |
| 6 | 1000 | CLK0 FRM0 | CLK1 FRM1 | CLK2 FRM2 | CLK3 FRM3 | CLK4 FRM4 | | | |
| 6 | 1001 | CLK0 FRM0 | | | | CLK4 FRM4 | CLK5 FRM5 | CLK6 FRM6 | CLK7 FRM7 |
| 7 | 1010 | CLK0 FRM0 | CLK1 FRM1 | CLK2 FRM2 | | BUS WIDTH=16 CLK4 FRM4 | | | |
| 7 | 1011 | CLK0 FRM0 | | | | CLK4 FRM4 | | CLK6 FRM6 | CLK7 FRM7 |
| 8 | 1100 | CLK0 FRM0 | | CLK2 FRM2 | | CLK4 FRM4 | | | |
| 8 | 1101 | CLK0 FRM0 | | | | CLK4 FRM4 | | CLK6 FRM6 | |
| 9 | 1110 | CLK0 FRM0 | | | | CLK4 FRM4 | | | |
| 10 | 1111 | CLK0 FRM0 | | | | | | | |

CONFIG CODE

PROGRAMMABLE DATA PORT CLOCKING SYSTEM WITH AUTOMATIC DISABLE AND NOISE SUPPRESSION FOR ASYNCHRONOUS TRANSFER MODE SYSTEMS

This application is a continuation of U.S. patent application Ser. No. 08/478,325, filed Jun. 7, 1995, now U.S. Pat. No. 5,680,595.

FIELD OF THE INVENTION

The present invention relates to data port clocking systems and, in particular, to a programmable data port clocking system with automatic disable and noise suppression for asynchronous transfer mode systems.

BACKGROUND OF THE INVENTION

Modem computer networks require versatility and programmability for point-to-point communications. Local area network (LAN) designs incorporate many complex network topologies, which are software-controlled to provide multiple channels between nodes on the network system. Modem computer networks provide multiple links between nodes. To establish the node-to-node links, each network must have a hierarchy for addressing and prioritization of traffic over the links.

One example of a modem computer network is an asynchronous transfer mode (ATM) network, such as described in "ATM Switching: A Brief Introduction," by Lee Goldberg, Electronic Design Magazine, Dec. 16, 1994, page 88. Goldberg describes an ATM system as a series of virtual paths between switch ports, and virtual channels as logical segments of bandwidth within each virtual path. ATM networks are very programmable and allocate link bandwidths to each of the virtual paths and virtual channels. Programmable bandwidth allocation requires highly programmable network switch elements to change virtual channel and virtual path bandwidth allocations easily and rapidly.

Network switch elements must respond to network commands for allocating the bandwidth of each link into virtual paths and virtual channels. Each network switch element contains multiple programmable data ports for receiving and transmitting ATM data packets, called "cells". Cell widths vary with the bandwidth of each virtual channel, requiring different combinations of data ports for differing cell combinations. The transfer of cells in each data port is controlled by a clocking system.

Therefore, there is a need in the art for a highly programmable data port clocking system. The data port clocking system must coordinate the clocking of the different data ports based on cell width to programmably adjust the virtual channels of the ATM network system. Such a system should feature automatic disable and noise suppression to prevent spurious generation of digital information onto the network and ease of use in board design.

SUMMARY OF THE INVENTION

The present disclosure describes a system for clocking programmable multi-configuration data ports. The present data port clocking system is designed to provide software programmability in an ATM datapath chip for switches, concentrators, and expanders in asynchronous transfer mode (ATM) networks.

The present clocking system provides automatic disable of clock outputs for efficient board layout and reduced hardware to handle the unused clock inputs.

Another embodiment of the present data port clocking system includes a noise suppression circuit to eliminate spurious clocking of the ATM electronics. This prevents spurious generation of erroneous information being clocked into a system.

BRIEF DESCRIPTION OF THE DRAWINGS

In the drawings, where like numerals describe like components throughout the several views:

FIG. 4 is a schematic diagram of data port and clocking configurations for one embodiment of the present data port clocking system;

DETAILED DESCRIPTION OF THE PREFERRED EMBODIMENT

In the following detailed description of the preferred embodiment, references are made to the accompanying drawings which form a part hereof, and in which is shown by way of illustration specific embodiments in which the inventions may be practiced. These embodiments are described in sufficient detail to enable those skilled in the art to practice the invention, and it is to be understood that other embodiments may be utilized and that structural changes may be made without departing from the spirit and scope of the present inventions. The following detailed description is, therefore, not to be taken in a limiting sense, and the scope of the present inventions is defined by the appended claims and equivalents thereof.

Figure 1:
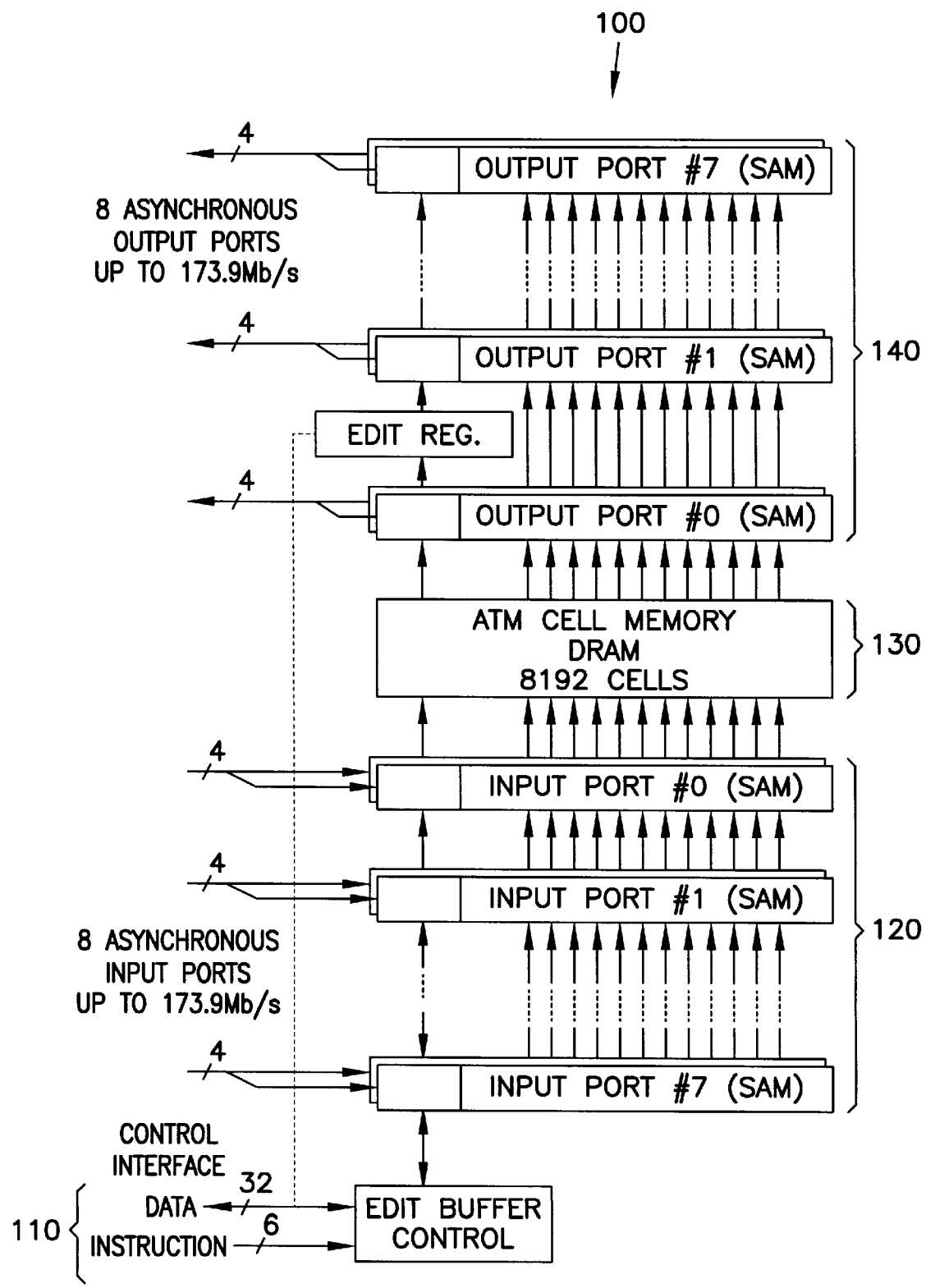
FIG. 1 shows a block diagram of an asynchronous transfer mode (ATM) datapath chip.

FIG. 1 shows one example of an asynchronous transfer mode (ATM) datapath chip for ATM networks. The architecture of the ATM datapath chip can be subdivided into four main building blocks: a control interface 110 for the ATM datapath chip 100, eight asynchronous input ports 120, an ATM cell memory comprising a dynamic random access memory (DRAM) 130, and eight asynchronous output ports 140.

The control interface 110 contains a configuration register 510 which is programmed to configure the asynchronous input and output ports of the ATM datapath chip 100. Each port in the chip operates asynchronously and at any clock rate within its range. In one embodiment, the clock period for any port can be greater than or equal to 23 nanoseconds and the port data bus is 4-bit parallel.

Figure 2:
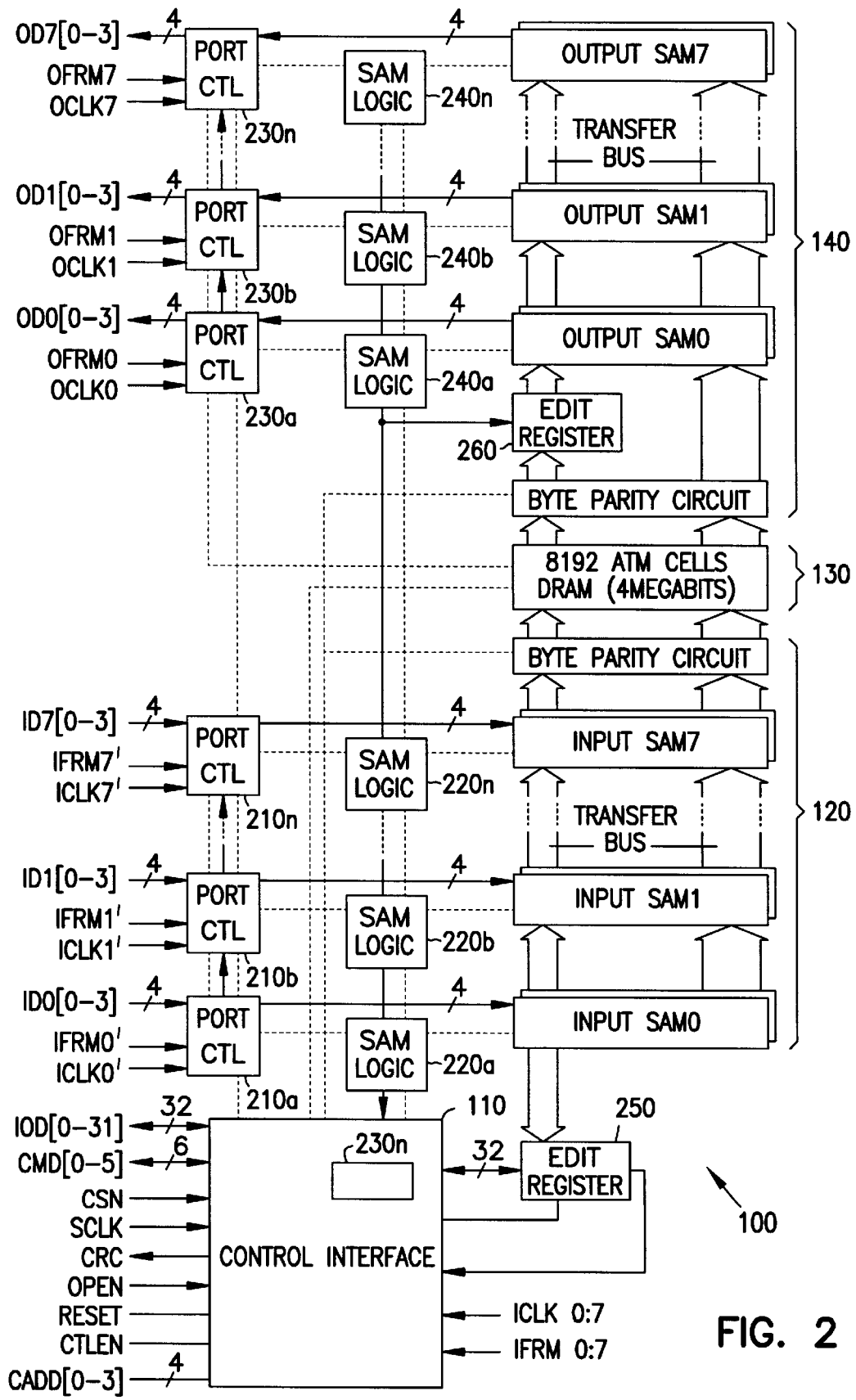
FIG. 2 shows a detailed block diagram of an ATM datapath chip.

Referring now to FIG. 2, a more detailed logic diagram of the ATM datapath chip 100 is provided in which asynchronous input ports 210a–210n are used to control incoming clock signals, framing signals, and data inputs for input serial access memories 0–7 ("input SAMs"), respectively, for an eight port system. In this example, eight separate asynchronous input ports 210a–210n are illustrated, however, those skilled in the art will readily recognize that other numbers of input ports could be utilized without departing from the scope and spirit of the present invention. Input data port clocking signals are designated by ICLKn and input data port framing signals are designated by IFRMn. The input data lines in this embodiment are shown as IDx[0–3] to indicate four parallel input bits per asynchronous input port 210; however, those skilled in the art will readily recognize that other numbers of input bits may be implemented without departing from the scope and spirit of the present invention.

ATM Cell Flow

ATM networks transmit asynchronous groupings of cells, called "ATM cells", which are collections of bit data delivered from point-to-point in the ATM network. The data flow is best described by an example using a hypothetical input x register. In the ATM datapath chip 100, as shown in FIG. 2, ATM cells enter the chip 100 through the IDx[0–3] pins of the asynchronous input port 210x. The four-bit parallel stream is loaded into an input SAM x by the ICLKx clock associated with asynchronous input port 210x. A framing signal, IFRMx, marks the first data nibble of the ATM cell and is used to start an input SAM x load. Once a complete cell has been loaded into input SAM x, the SAM x control logic 220x sets an input SAM fault status bit in control interface 110. The control interface 110 detects when an input SAM is full by reading the input SAM fault status bits. Upon an input SAM full condition the control interface writes the contents of the input SAM into DRAM 130.

Figure 3A:
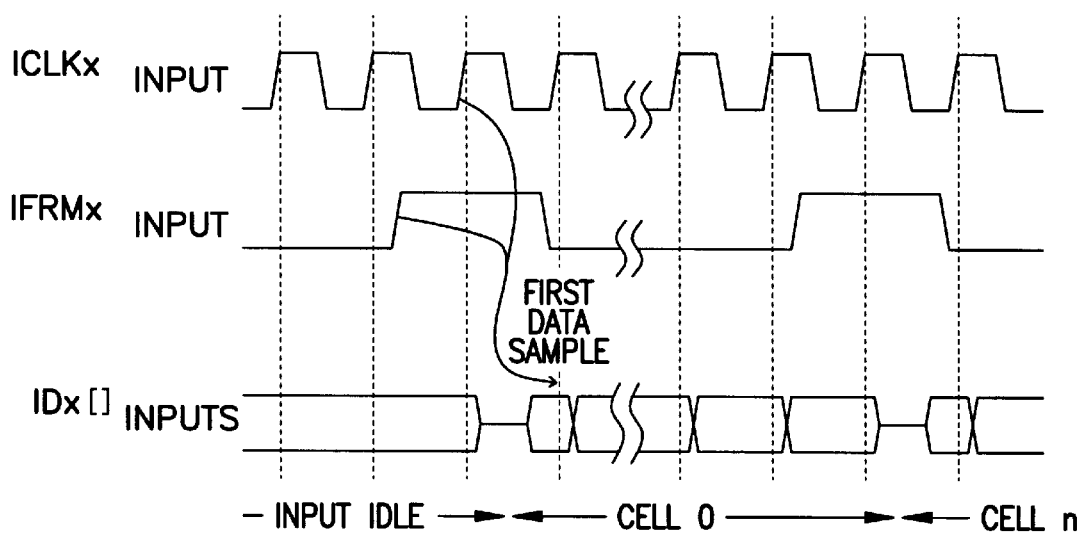
FIG. 3A is a timing diagram showing the relationship between the input clock signal and the input frame signal to the input data bits.

FIG. 3A shows that the ICLKx signal is used to clock in ATM cells until an entire frame has been received, which is signalled by a transition on the IFRMx signal line. Similarly, control interface 110 monitors asynchronous output ports 140 comprising output ports 230a–230n via SAM logic 240a–240n.

Figure 3B:
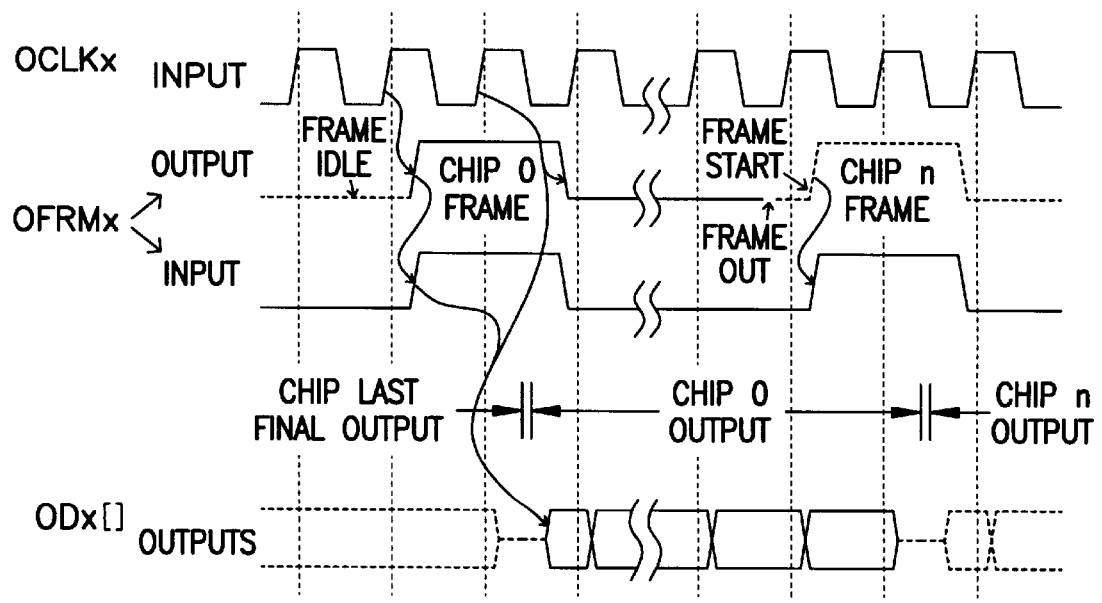
FIG. 3B is a detailed timing diagram showing the relationship between the output clock signal and the output frame signal to the output data bits.

The data to be output from pins ODx[0–3] on output ports 230a–230n is clocked by OCLKx signals, and the framing of the output data is signaled by signal line OFRMx as shown in FIG. 3B.

The ATM cell in this embodiment consists 56 bytes, including: four bytes of header, 48 bytes of data, and one byte of header-error-check (HEC). The remaining space is either three or four bytes, depending on the presence of the HEC. These additional bytes are referred to as "prepend/ postpend" data, which can be generated, read, written, and stripped through cell editing operations and configuration parameters.

The input edit buffer 250 and CRC circuitry, are used to modify a cell captured in the input SAM before storing it in DRAM 130. Output edit register 260 is utilized to modify the cell contents at the last possible moment prior to sending on an output port.

Input and Output Port Timing

The ATM datapath chip 100 protocol is composed of a data bus and a start of frame marker, synchronous with the clock. The start of frame marker output (OFRMx) and data outputs (ODx[ ]) of the sender are connected to the start of frame marker input (IFRMx) and data inputs (IDx[ ]) of the receiver and both are connected to the externally supplied clock (OCLKx, ICLKx).

FIG. 3A shows that on the first positive ICLKx edge after IFRMx goes logic low, the first ATM cell data is loaded into the input SAM. The data will stream into the port, every ICLKx time, until the stop byte position address from the configuration register is reached. The input SAM full status is set by reaching the stop byte position address. If the IFRMx input goes to a logic 1 before the stop position address is reached, the start byte position address will be reloaded, the input SAM full status will not be set, and a frame to short error status will result in the error register. The 'short cell' is effectively discarded, and the input SAM side with the short cell data overwrites with the next cell. If the IFRMx input doesn't transition to logic 1 when the stop position address is reached, the input SAM full status will still be set, but a frame too long error status will result in the error register. The start byte position address will not be reloaded until the IFRMx input transitions to logic 1 , and no more data will be clocked into the input SAM. The 'long cell' is kept, and the input SAM will accumulate the next cell in the other half of the input SAM when the next IFRMx logic 1 transition arrives. If both halves of an input SAM are full and an IFRMx input goes to logic 1 , an overflow status will result in the error register indicating a cell forgotten by the external controller. The 'forgotten cell' will be overwritten in the input SAM. The 'forgotten cell' is effectively discarded.

Referring now to FIG. 3B, an OFRMx logic 1 is asserted for one OCLKx input cycle to start a frame. The first data is presented on the ODx[ ] pins one clock time after OFRMx. The OFRMx input is always connected to the OFRMx pin in response to internal or external OFRMx outputs in the same way. Output ports manage frames the same as input ports. The configuration register supplies start byte position address and stop byte position address fields, but there are no error status conditions, and the data is dispatched from the output SAM over the ODx[ ] pins each OCLKx cycle.

Data Port Clocking Configurations

Figure 5:
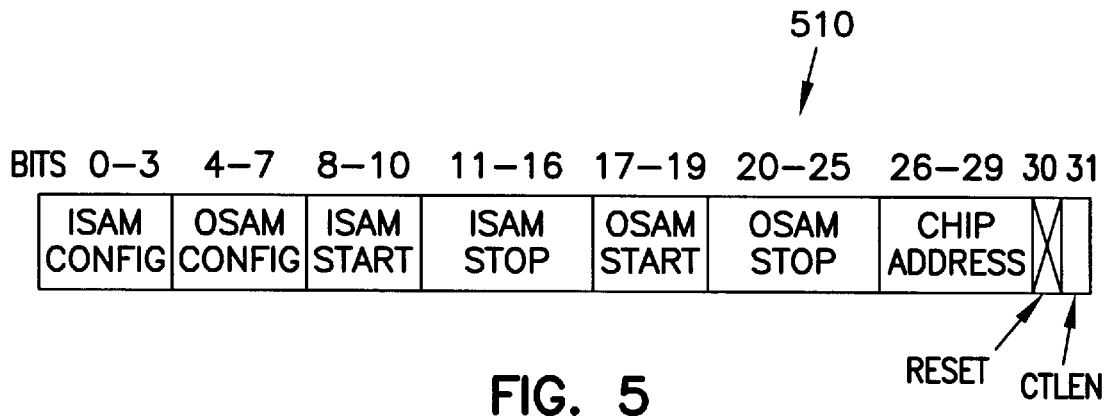
FIG. 5 is a block diagram of the configuration register of the ATM datapath chip.

Several configurations of the ATM datapath chips are possible by programing a configuration register 510, as shown in FIG. 5, to configure each port on the chip so that it can operate asynchronously and at any clock rate within its clock range. FIG. 4 illustrates a number of port configurations and an associated configuration code under one embodiment of the present clocking system. For example, under entry no. 1, having a configuration code $0000_b$, each port utilizes its own clocking and framing input pins for timing purposes. This is the default configuration. Another example is shown in entry no. 6 under configuration code $1001_b$, whereby ports 0, 1, 2, and 3 are clocked using clock pin 0 and framing input signal 0. Additionally, it is observed that clocks 4, 5, 6, and 7 are clocked by their own respective clock and framing input pins. The entire 8 ports (asynchronous ports 0–7) may be all used in a combined format under configuration code $1111_b$, whereby all of the ports are clocked simultaneously using clocking pin 0 and framing pin 0.

Higher port throughput is accomplished by using two, four, or all eight data ports to make a wider bus of 8, 16, or 32 bits. Accordingly, the effective number of ports is reduced to four, two, or one. There is only one clock and frame pin required for a port, so the extra clock and frame pins go unused in these configurations.

Other data port configurations are possible, and those presented in FIG. 4 were not intended in a limiting or exclusive sense. Those skilled in the art will recognize that other permutations of the configuration of ports are possible without departing from the scope and spirit of the present invention.

Configuration Register

The configuration register 510 as shown in FIG. 5 is loaded into the control interface 110 via the IOD[0–31] bus by a special load configuration instruction. The register 510 must be loaded at startup to set the chip 100 in a known state. The data field assignments of configuration register 510 are as follows:

ISAM config.—A 4-bit configuration code for the 16-bit input port 120 according to the configurations described in FIG. 4.

OSAM config.—A 4-bit configuration code for the 16 output ports 140 using configuration codes as shown in FIG. 4.

ISAM start bit—A 3-bit start byte position address for the input SAMs which are individually addressable.

ISAM stop bit—A 6-bit stop byte position address for the input SAMs.

OSAM start—A 3-bit start byte position address for the output SAMs.

OSAM stop—A 6-bit stop byte position address for the output SAMs.

Chip address—A 4-bit chip address compare field for parallel operation of the ATM datapath chips 100.

Reset—A1-bit flag used to reset the status and output bits of the control interface 110.

CTLEN—A 1-bit enable bit for the control interface outputs used in parallel operation.

Figure 6:
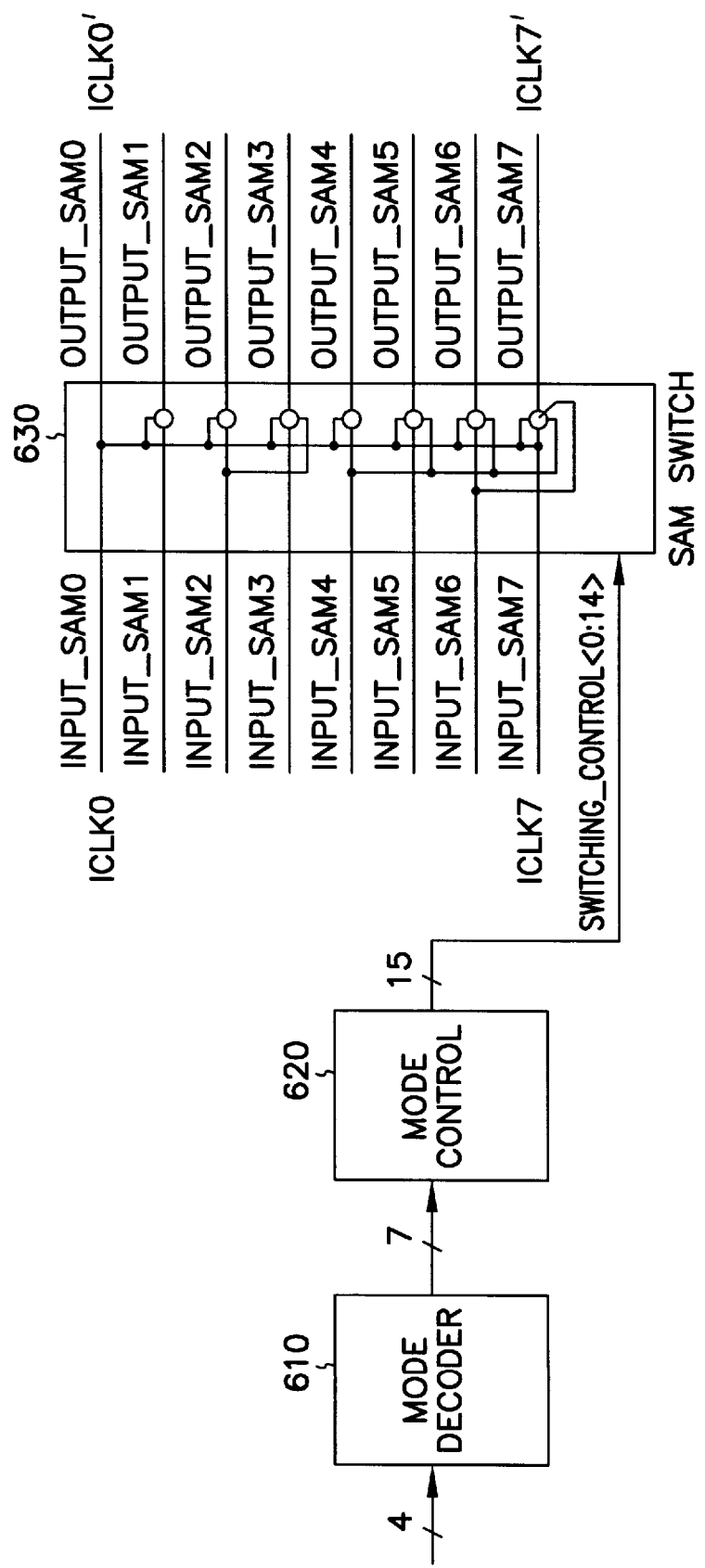
FIG. 6 is a block diagram of one embodiment of the present data port clocking system.

Detailed Description of Electrical Components Used in One Embodiment of the Present Clocking System FIG. 6 illustrates a block diagram showing a mode decoder 610 which is used to decode mode words as stored in configuration register 510. The decoded mode words from mode decoder 610 are further processed by mode control 620 to generate a number of switching control signals for configuration of SAM switch 630. The following discussion explains the clocking system for the input clock (ICLK) clocking signal; however, it should be kept in mind that an identical hardware realization is also implemented for converting the configuration modes for purposes of the framing clock (IFRM). Therefore, this discussion for generating the input clock ICLK is analogous to that for generating the framing clock IFRM. Similarly, this configuration system is applicable to the generation of the output clock OCLK as well as generation of the output framing clock OFRM.

Figure 7:
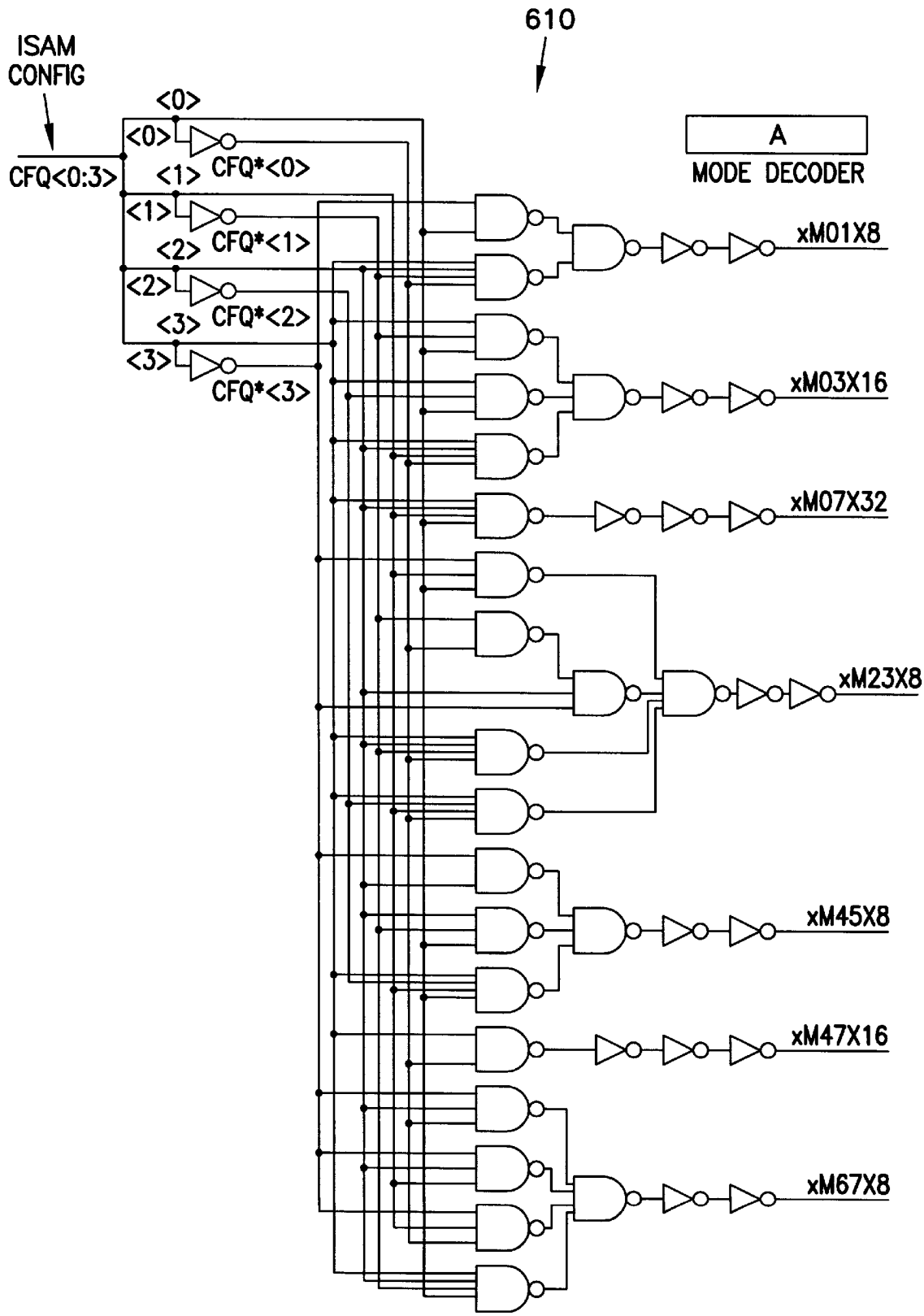
FIG. 7 is a detailed logic diagram of one embodiment of a mode decoder for the present clocking system.

FIG. 7 is a detailed logic diagram showing one embodiment of a mode decoder 610. As stated earlier, configuration register 510 is loaded in the initial stages of operation of the ATM datapath chip. Input SAM configuration bits are loaded into the mode decoder at point ISAM config. [0:3]. Depending on which configuration mode is programmed into configuration register 510, mode decoder 610 combines the appropriate input clock signal (ICLKx) to generate the data port configurations shown in FIG. 4.

Clocking combinations are necessary only if two or more input ports are clocked by a single input clock signal.

Decoding of the mode decoder outputs is best described by an example. For instance, output xM01X8 indicates that ports 0 and 1 are combined in an 8-bit port configuration as shown in configuration code 0001 of FIG. 4. This is also true of configuration code 0011, 0101, 0111, and 1100. Another example is output xM03X16, whereby input SAMs 0–3 are concatenated to provide a 16-bit output as demonstrated by configuration code 1001, 1011, 1101, and 1110 of FIG. 4. Therefore, the outputs of mode decoder 610 represent the 'building blocks' of the port configurations found in FIG. 4. Different permutations of these 'building blocks' provide the 16 modes as shown in FIG. 4.

Figure 8:
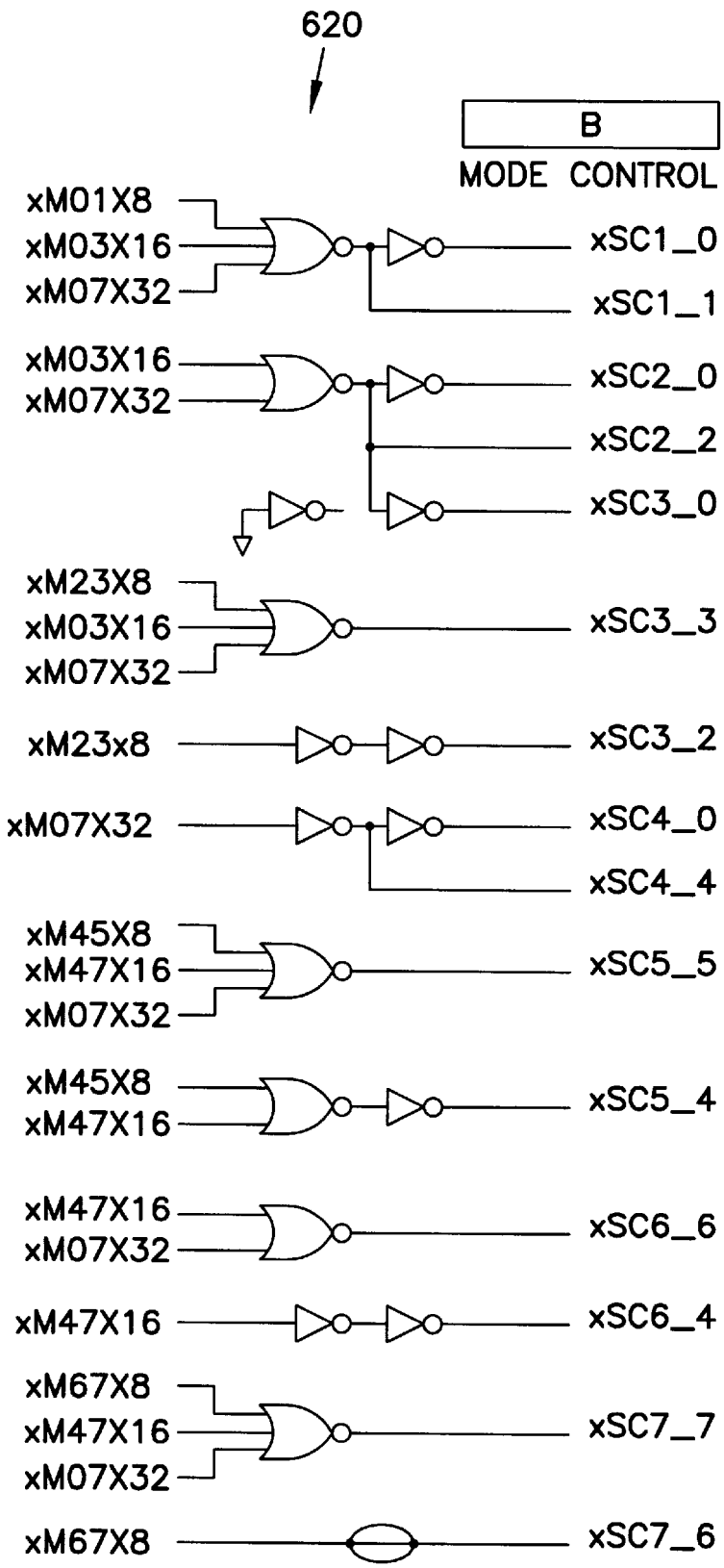
FIG. 8 is a detailed logic diagram of one embodiment of a mode control for the present clocking system.

The outputs of mode decoder 610 are provided to mode control 620 as shown in the detailed logic diagram of FIG. 8. Mode control 620 combines the various 'building blocks' or outputs of mode decoder 610 in order to provide the appropriate input clock timing signals as represented in FIG. 4 for each various configuration code. The 16 outputs generated by mode control 620 are utilized by SAM switch 630 to generate the appropriate input clocking signals for ICLKx of input ports 210a–210n as shown in FIG. 2.

Figure 11:
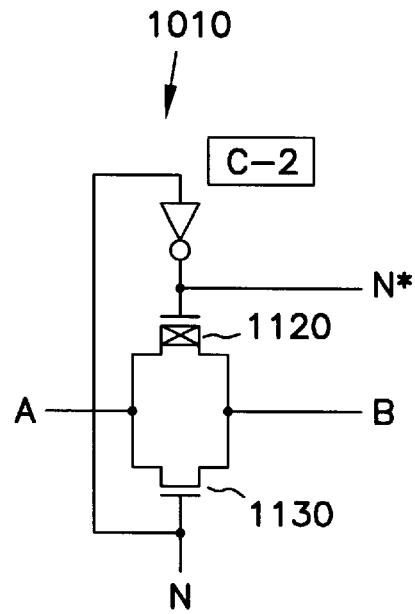
FIG. 11 is a detailed logic diagram of one embodiment of a data multiplexer used in the SAM switch.
Figure 12:
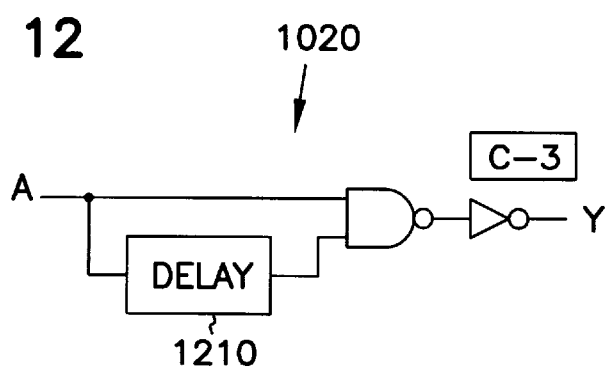
FIG. 12 is a detailed logic diagram showing one embodiment of a noise suppression circuit for the SAM switch.
Figure 9A:
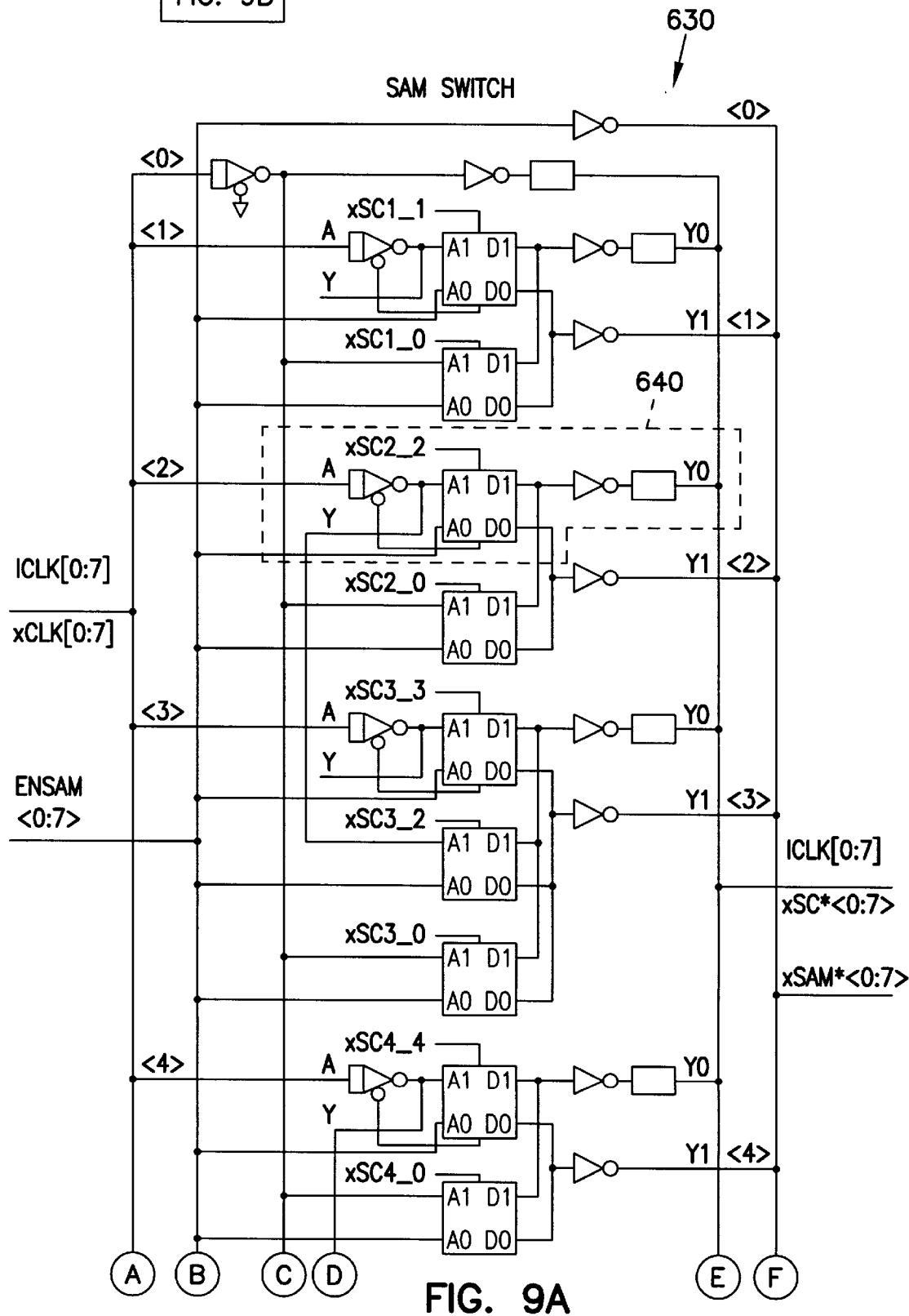
FIG. 9 is a detailed logic diagram of one embodiment of a serial access memory (SAM) switch for the present clocking system.
Figure 9B:
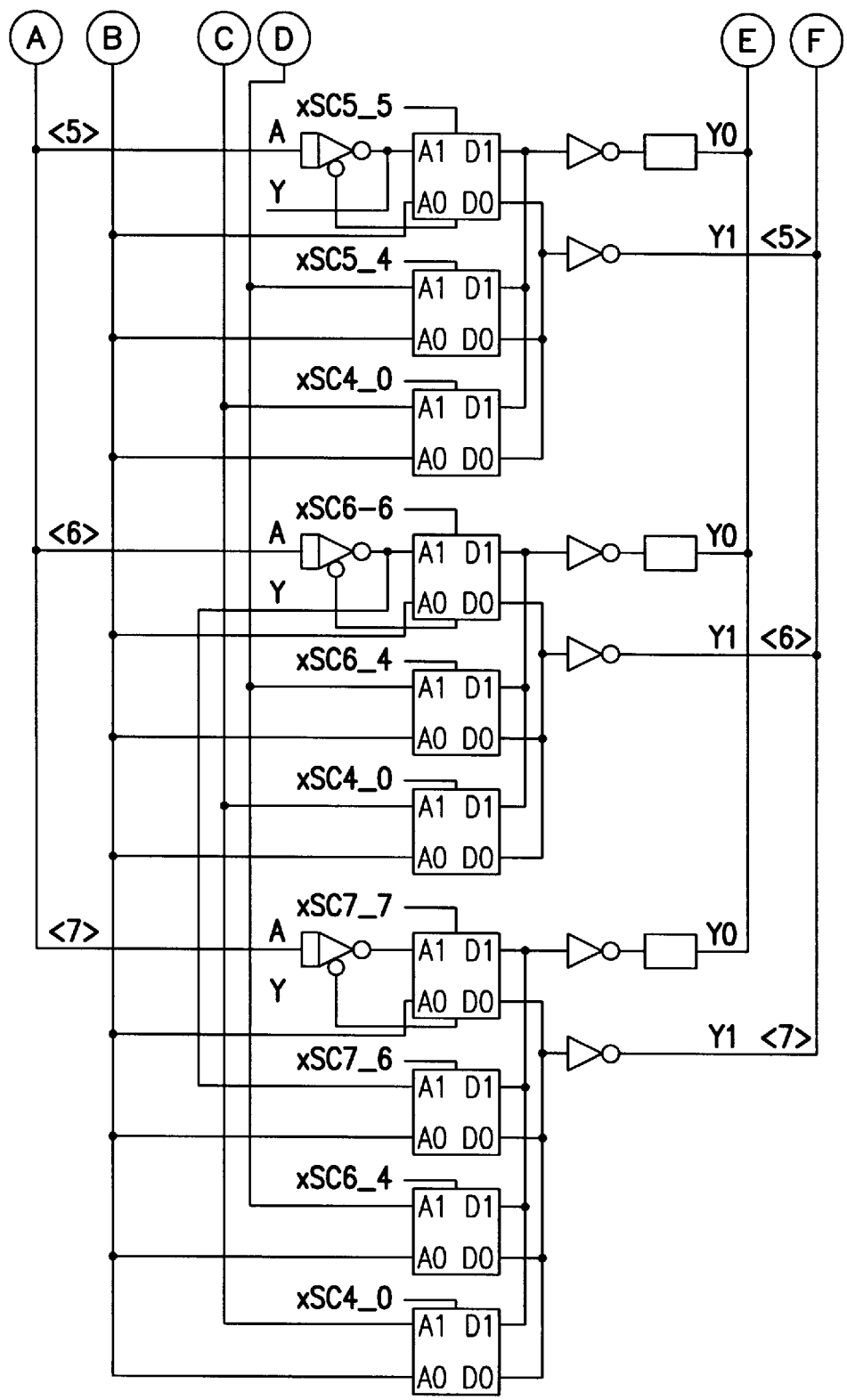
Figure 10:
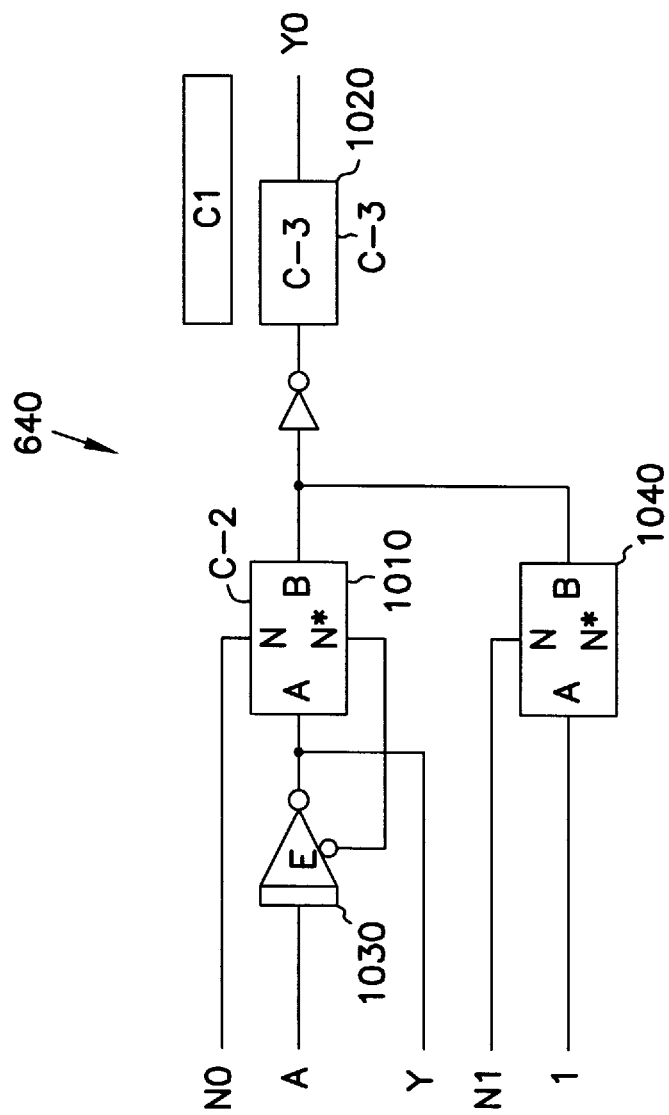
FIG. 10 is a detailed logic diagram of a single stage of the SAM switch.

The SAM switch 630 is shown in FIG. 9. FIG. 10 illustrates module 640 which is one section of SAM switch 630 and which is replicated in all but the first stage of SAM switch 630. This portion of the clocking circuit incorporates a multiplexer 1010 as shown in FIG. 11, comprising a p channel enhancement mode field effect transistor (FET) 1120, and an n channel enhancement mode FET 1130. The circuit of FIG. 10 also employs a noise suppression circuit 1020, which incorporates a delay 1210, shown in FIG. 12, to provide a minimum pulse blocking threshold. Therefore, pulses entering port A of noise suppression circuit 1020, will not propagate to output port Y unless they have a duration which exceeds the delay value of delay 1210.

Automatic disable is provided so that when the clocking circuit is in special modes x8, 16, 32 and have therefore, unused ICLK, IFRM, OCLK, OFRM pins, the user does not have to route to them in his design and tie them to Vcc/Vss level or a pull-down/pull-up register network. This saves components (resistors) and board routes. In x32 mode there would be 28 unconnected clocks that would float if not deactivated by automatic disable.

The automatic disable circuit is best illustrated by FIG. 10, whereby gate 1030 is enabled by multiplexer 1010 if input N0 is active high, since the enable of gate 1030 is enabled by a logic low output from N* of multiplexer 1010. Inputs N1 and 1 of multiplexer 1040 are used to route other clocking inputs to output Y0.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the electrical, computer, and telecommunications arts will readily appreciate that the present invention may be implemented in a very wide variety of embodiments. This application is intended to cover any adaptations or variations of the preferred embodiment discussed herein. Therefore, it is manifestly intended that this invention be limited only by the claims and the equivalents thereof.

We claim:

1. A method for programming a set of data ports to form a data path, comprising the steps of:

preselecting a plurality of subsets of the data ports to define a plurality of data paths having varying widths;

assigning a specific mode word to each of the data paths;

programming a configuration register with the specific mode word for a particular width data path; and decoding the specific mode word to program the data ports to enable a data path having the particular width.

2. The method of claim 1, wherein each data port is controlled by a clock signal and further comprising the step of allocating a single clock signal to control each preselected subset of the data ports.

3. The method of claim 2, further comprising the step of automatically disabling clock signals which are unused by the subset of data ports defining the particular width.

4. The method of claim 1, wherein each data port is controlled by a framing signal and further comprising the step of allocating a single framing signal to control each preselected subset of the data ports.

5. The method of claim 1, further comprising the step of suppressing inputs with a pulse duration less than a predetermined delay time.

6. The method of claim 1, wherein a mode word is assigned to multiple ones of the plurality of data paths and the step of decoding the specific mode word programs the data ports to form multiple data paths.

7. A method of dynamically changing bandwidth allocation in a logic chip having a plurality of data ports, the method comprising the steps of:

defining a plurality of bandwidth configurations;

allocating specific data ports to each of the bandwidth configurations;

assigning a configuration code to each of the bandwidth configurations; and changing the bandwidth allocation by sending the configuration code assigned to a desired bandwidth configuration to a mode controller for the data ports.

8. The method of claim 7, wherein each data port is controlled by a clock signal and further comprising the step of determining a single clock signal to control the data ports allocated to each of the bandwidth configurations.

9. The method of claim 8, further comprising the step of automatically disabling clock signals unused by the data ports allocated to each of the bandwidth configurations.

10. The method of claim 7, further comprising the step of suppressing data inputs with a pulse duration less than a predetermined delay time.

11. A method of enabling multiple virtual channels in an asynchronous transfer mode (ATM) datapath chip having a plurality of data ports defining a maximum bandwidth, the method comprising the steps of:

defining a bandwidth for each of the virtual channels;

allocating at least one data port to each of the virtual channels to provide the defined bandwidth;

combining the virtual channels into a plurality of virtual path configurations, each virtual path having the maximum bandwidth;

assigning a configuration code to each of the virtual path configurations;

selecting the configuration code assigned to a desired virtual path configuration; and programming the plurality of data ports in accordance with the configuration code to enable the virtual channels in the desired virtual path configuration.

12. The method of claim 11, wherein each data port is controlled by a clock signal and further comprising the step of determining a single clock signal to control multiple data ports allocated to a virtual channel.

13. The method of claim 12, further comprising the step of automatically disabling clock signals which are unused by the multiple data ports.

14. The method of claim 11, wherein each data port is controlled by a framing signal and further comprising the step of allocating a single framing signal to control multiple data ports allocated to a virtual channel.

* * * * *

UNITED STATES PATENT AND TRADEMARK OFFICE
CERTIFICATE OF CORRECTION

PATENT NO. : 5,838,959
DATED : 07/14/97
INVENTOR(S) : Thomann et al.

It is certified that error appears in the above-identified patent and that said Letters Patent is hereby corrected as shown below:

At Col. 1, line 18, please delete "Modem computer" and insert --Modern computer --.

At Col. 1, line 23, please delete "Modem computer" and insert --Modern computer --.

Signed and Sealed this

Third Day of August, 1999

Attest:

Q. TODD DICKINSON

Attesting Officer

Acting Commissioner of Patents and Trademarks